(No Model.)
E. L. D. HOYLE.
BATTER DROPPER AND CAKE BEATER.
No. 536,527. Patented Mar. 26, 1895.
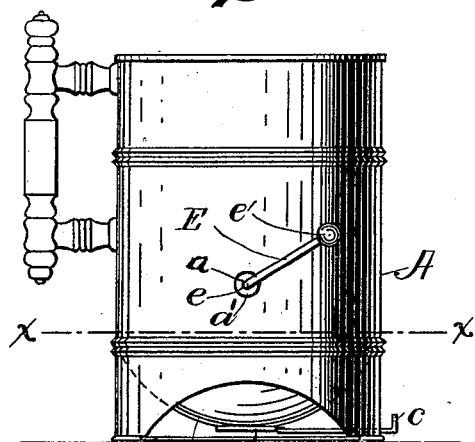
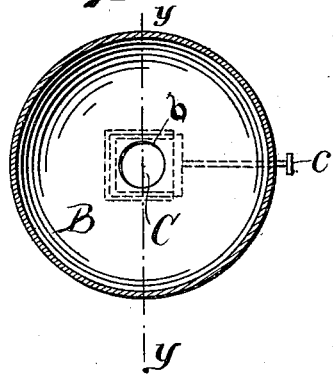
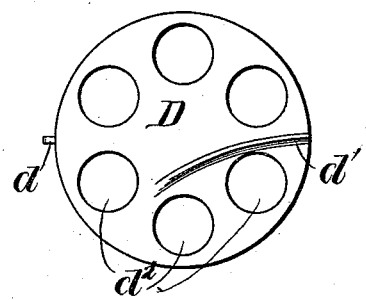
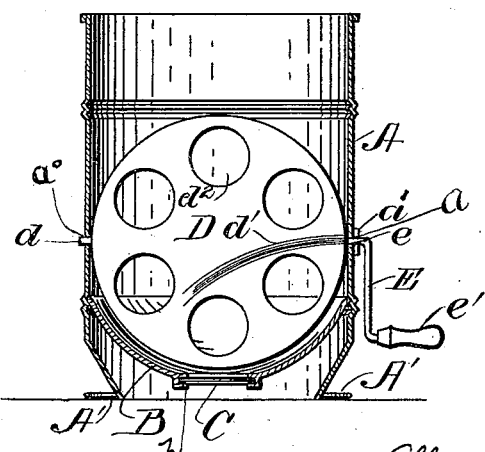
Witnesses:
Inventor.
Ella L. D. Hoyle,
By Whitman & Wilkinson
Attorneys.

UNITED STATES PATENT OFFICE.

ELLA L. D. HOYLE, OF NEW ORLEANS, LOUISIANA.

BATTER-DROPPER AND CAKE-BEATER.

SPECIFICATION forming part of Letters Patent No. 536,527, dated March 26, 1895.

Application filed September 24, 1894. Serial No. 523,991. (No model.)

*To all whom it may concern:*

Be it known that I, ELLA LINA DUFF HOYLE, a citizen of the United States, residing at New Orleans, in the parish of Orleans and State of Louisiana, have invented certain new and useful Improvements in Batter-Droppers and Cake-Beaters; and I do declare the following to be a full, clear, and exact description of the invention, such as will enable others skilled in the art to which it appertains to make and use the same.

My invention relates to improvements in batter droppers and cake beaters, and it consists of certain novel features hereinafter described and claimed.

Reference is had to the accompanying drawings, in which the same parts are indicated by the same letters throughout the several views.

Figure 1 represents a side elevation of the improved batter dropper and cake beater, the opening in the bottom of the same being shown as closed. Fig. 2 represents a vertical section through the axis of the utensil, the handle being shown in a different position from that illustrated in Fig. 1. Fig. 3 represents a detailed view of the perforated disk used for beating up the batter, as detached from the utensil, and Fig. 4 represents a section along the line $x\,x$ of Fig. 1 and looking down.

A represents a cylindrical utensil, preferably made of tin, and provided with a supporting ring A' connected to the base thereof. This utensil is provided with a spherical bottom B, having an aperture $b$, in the base thereof, which is closed by the slide C, operated by the hand-lug $c$. The vessel A is perforated as at $a^0$ and $a$ for the journals of the perforated disk D. This disk D is provided with a lug or nipple $d$ which forms one journal thereof, the said journal being adapted to enter into the journal bearing $a^0$, while the opposite side of the said disk is provided with a curved recess $d'$ adapted to receive the curved end $e$ of the hand-crank E which passes through the opposite journal bearing $a$. This journal bearing $a$ is preferably reinforced by a ring $a'$ in order to take up the wear on the bent portion $e$ of the hand-crank E. This hand-crank E is ordinarily provided with a handle $e'$ as shown most clearly in Fig. 2.

In assembling the device, the disk D being ordinarily detached therefrom as shown in Fig. 3, the nipple $d$ is inserted in the bearing $a^0$, and the curved recess $d'$ is made to register with the journal bearing $a$, when the curved portion $e$ of the hand-crank E is inserted into the said recess, thus forming a secure but detachable journal bearing for the disk D. Owing to the curved shape of this recess $d'$ the hand-crank E is so attached to the disk D as to render it possible to exert considerable energy in revolving the said disk without at the same time requiring any nice adjustments of the hand-crank, or any auxiliary means for locking the same in the disk D. The said disk is provided with any desired number of perforations $d^2$ for the purpose of enabling the same to break into and beat up the batter. The circular shape of the disk D enables the same to enter into and pass close to the interior surface of the spherical bottom B, thus preventing any large amount of the batter from adhering to the said bottom and not being properly mixed by the rotation of the disk D.

The amount of batter to be dropped out for each cake is regulated by means of the slide C.

In order to clean the utensil, the bent portion $e$ of the hand-crank is slid out of the curved recess $d'$, the journal $d$ is disengaged from its bearings $a^0$ by tilting the disk D upward, and the said disk is removed from the vessel A, when the smooth interior of the vessel, and the smooth exterior of the disk may be readily cleansed from any batter adhering thereto.

By the herein described construction the interior of the vessel A is made of such a shape that it may be readily cleansed when desired, while the disk D is made detachable so that it may be taken out of the utensil while the said utensil is being cleaned, and at the same time the said disk may be readily cleansed and made ready for use again in the utensil. The combination of the said disk with a species of hand-crank herein described renders the said disk readily adjustable in the apparatus, and readily detachable therefrom, while at the same time no exposed sharp angles are left in which the batter may accumulate and from which it would be with difficulty removed.

Having thus described my invention, what I claim, and desire to secure by Letters Patent of the United States, is—

1. In an improved cake beater and batter dropper, the combination with a cylindrical vessel, having a spherical bottom, with an aperture in said bottom, and means for closing said aperture, of journal bearings provided in said cylindrical vessel at opposite sides thereof, and a perforated disk having a nipple adapted to engage in one of said journal bearings, and a curved recess opposite to said nipple, with a hand-crank having a curved inner end passing through one of said journal bearings and engaging in said curved recess, substantially as and for the purposes described.

2. In an improved cake beater and batter dropper, the combination with a cylindrical vessel having a spherical bottom with an aperture in said bottom, at the base thereof, and a slide for closing said aperture, of journal bearings provided in said cylindrical vessel at opposite sides thereof; a disk provided with a plurality of perforations near the periphery thereof, and having a nipple adapted to engage in one of said journal bearings, and a curved recess opposite to said nipple, the said disk being adapted to revolve in close juxtaposition to the inner surface of said spherical bottom, and a hand-crank having a curved inner end passing through the journal bearing opposite said nipple and engaging in said curved recess, substantially as and for the purposes described.

In testimony whereof I affix my signature in presence of two witnesses.

ELLA L. D. HOYLE.

Witnesses:
JNO. J. WARD,
MARTIN FINNERTY.